United States Patent [19]

Taylor et al.

[11] Patent Number: 5,209,947
[45] Date of Patent: May 11, 1993

[54] PROCESS FOR THE PRODUCTION OF RECORD MATERIAL

[75] Inventors: David J. Taylor, Monks Risborough, England; Kenneth J. Shanton, Neenah, Wis.

[73] Assignee: The Wiggins Teape Group Limited, Basingstoke, England

[21] Appl. No.: 888,297

[22] Filed: May 26, 1992

Related U.S. Application Data

[63] Continuation of Ser. No. 627,756, Dec. 14, 1990, abandoned.

[30] Foreign Application Priority Data

Dec. 16, 1989 [GB] United Kingdom ............... 8928455

[51] Int. Cl.$^5$ ............................................. B41M 3/12
[52] U.S. Cl. ................................... 427/150; 427/151; 427/152; 427/380
[58] Field of Search ................... 427/150–152, 427/380

[56] References Cited

U.S. PATENT DOCUMENTS

| | | | |
|---|---|---|---|
| 2,702,765 | 2/1955 | Steinhardt | 427/150 |
| 2,730,456 | 1/1956 | Green et al. | 427/150 |
| 2,730,457 | 1/1956 | Green et al. | 427/150 |
| 2,757,085 | 7/1956 | Paquin | 92/21 |
| 3,223,546 | 12/1965 | Hemstock | 106/288 |
| 3,226,252 | 12/1965 | Hemstock et al. | 427/150 |
| 3,330,722 | 7/1967 | Amano et al. | 162/181 |
| 3,565,653 | 2/1971 | Hemstock et al. | 106/288 |
| 3,736,285 | 5/1973 | Miller | 260/29.6 R |
| 3,980,492 | 9/1976 | Thompson | 106/308 N |
| 4,022,735 | 5/1977 | Thompson | 260/29.7 W |
| 4,038,097 | 7/1977 | Traxler et al. | 106/288 B |
| 4,109,048 | 8/1978 | Dessauer et al. | 428/325 |
| 4,218,504 | 8/1980 | Yamato et al. | 428/207 |
| 4,289,806 | 9/1981 | Sato et al. | 427/150 |
| 4,387,117 | 6/1983 | Shanton | 427/150 |
| 4,391,850 | 7/1983 | Shanton | 427/150 |
| 4,435,004 | 3/1984 | Shanton | 282/27.5 |
| 4,458,922 | 6/1984 | Shanton | 346/225 |
| 4,509,065 | 4/1985 | Shanton | 346/225 |

FOREIGN PATENT DOCUMENTS

| | | |
|---|---|---|
| 666437 | 2/1952 | United Kingdom . |
| 1271304 | 4/1972 | United Kingdom . |
| 1307319 | 2/1973 | United Kingdom . |
| 1451982 | 10/1976 | United Kingdom . |
| 1467003 | 3/1977 | United Kingdom . |
| 1497663 | 1/1978 | United Kingdom . |

*Primary Examiner*—Janyce Bell
*Attorney, Agent, or Firm*—Burns, Doane, Swecker & Mathis

[57] ABSTRACT

A color developing material is produced by:

a) gradually adding a metal silicate solution to a solution of an aluminum salt which is initially at a pH below 4 until the pH of the resulting mixture is approximately 4, thereby to induce some precipitation and to form a sol;

b) gradually adding alkali to said sol to raise the pH to approximately 7, thereby to induce further precipitation and gel the sol or further gel the sol, said gelled sol being a hydrated silica/hydrated alumina composite;

c) separating the gel from the aqueous medium and washing the resulting product to remove dissolved salts; and d) drying the washed product and reducing it in particle size.

This color developing material is then formulated into a coating composition, applied to a paper base and dried to produce a color developing record material as used in pressure-sensitive (carbonless) copying pape sets.

10 Claims, No Drawings

PROCESS FOR THE PRODUCTION OF RECORD MATERIAL

This application is a continuation of application Ser. No. 07/627,756, filed Dec. 14, 1990, now abandoned.

This invention relates to a process for the production of record material carrying a hydrated silica/hydrated alumina composite as an active colour developing ingredient. The record material is primarily for use in pressure-sensitive record sets (or carbonless copying paper as such sets are more usually known).

A colour developer composition, as is well-known in the art, is a composition which gives rise to a coloured species on contact with a colourless solution of a chromogenic material (such chromogenic materials are also called colour formers).

Pressure-sensitive record sets may be of various types. The commonest, known as the transfer type, comprises an upper sheet (hereafter referred to as a CB or coated back sheet), coated on its lower surface with microcapsules containing a solution in an oil solvent of at least one chromogenic material and a lower sheet (hereinafter referred to as a CF or coated front sheet) coated on its upper surface with a colour developer composition. If more than one copy is required, one or more intermediate sheets (hereafter referred to as CFB or coated front and back sheets) are provided, each of which is coated on its lower surface with microcapsules and on its upper surface with colour developer composition. Pressure exerted on the sheets by writing, typing or other imaging pressure ruptures the microcapsules thereby releasing chromogenic material solution on to the colour developer composition and giving rise to a chemical reaction which developes the colour of the chromogenic material and so produces an image.

In another type of pressure-sensitive record set, known as the self-contained or autogeneous type, both the microcapsules containing the chromogenic material and the colour developer composition are present in juxtaposition in or on the same sheet.

Such pressure-sensitive record sets have been widely disclosed in the patent literature. For example, transfer sets are described in U.S. Pat. No. 2730456, and self-contained sets are described in U.S. Pat. No. 2730457.

The use of silica/alumina materials as colour developers has been proposed in UK Patent No. 1467003 and in European Patent Applications Nos. 42265 A and 42266 A.

UK Patent No. 1467003 is particularly concerned with the use as colour developers of amorphous silica/alumina mixtures derived from petroleum cracking catalysts. No details of the processes used to prepare the catalysts are disclosed. The patent does however disclose the preparation of a sample of silica/alumina by reacting an aluminium sulphate solution with aqueous sodium silicate, but no details beyond this are disclosed.

European Patent Applications Nos. 42265 A and 42266 A are concerned with amorphous hydrated silica/hydrated alumina composites, and numerous examples of methods for the preparation of such composites are disclosed. These include the deposition of hydrated alumina on to previously precipitated hydrated silica, and the preparation of the hydrated silica/hydrated alumina composite in situ from aluminium and silicate salts, e.g. aluminium sulphate and sodium silicate. The preparation of hydrated silica/hydrated alumina composites using aluminate salts is also disclosed. The in situ preparative techniques disclosed include (a) the use of a reaction mixture which is initially alkaline and is lowered in pH to produce the desired composite and (b) the initial acidification of a silicate solution to pH7, followed by addition of aluminium sulphate solution and raising the pH with alkali.

A problem which may be encountered when making hydrated silica/hydrated alumina composites as disclosed in European Patent Applications Nos. 42265 A and 42266 A is that sudden severe viscosity increases, or even gelling, may occur at certain stages of the process. This may be countered to some extent by adding dilution water at the start of, or during, the process, but this results in a lower solids content product, which is disadvantageous. A further problem is that flocs may form in the composite product, which tends to lead to "dusting" of the coating in the eventual coated record material product. This dusting can be countered to a certain extent by raising the binder level, but this carries a penalty in that the reactivity, i.e. colour developing effect, of the record material is lessened.

European Patent Application No. 81341 A is concerned with rne use as colour developers of composites of hydrated zirconia and, inter alia, hydrated silica and hydrated alumina. A variety of preparative routes for making hydrated zirconia/hydrated silica/hydrated alumina composites is disclosed, including a process in which an aqueous mixture of a zirconium salt, aluminium sulphate and sodium silicate is produced at a pH below 4.0 and the pH of the mixture is then raised to 7.0 to produce the hydrated zirconia/hydrated silica/hydrated alumina composite. The hydrated zirconia content of the composite is 20%, 33% or 60% by weight.

It has now been found that hydrated silica/hydrated alumina composites which exhibit improved performance (including improved printability performance), improved product uniformity, improved ease of manufacture and/or improved ease of utilisation compared with those disclosed in European Patent Applications Nos. 42265 A and 42266 A may be obtained if the composites are prepared by raising the pH of an initially acid reaction mixture rather than by lowering the pH of an initially alkaline reaction mixture as is disclosed in European Patent Applications Nos. 42265 A and 42266 A.

Accordingly, the present invention provides a process for the production of record material carrying a colour developer composition incorporating a hydrated silica/hydrated alumina composite in which hydrated silica predominates, in which process the composite is precipitated from an aqueous medium containing a solution of a metal silicate and an aluminium salt, and a coating composition incorporating the precipitated composite is formulated and then applied to a substrate which is subsequently dried to produce said record material, the process being characterized by the steps of:

a) gradually adding a metal silicate solution to a solution of an aluminium salt which is initially at a pH below 4 until the pH of the resulting mixture is approximately 4, thereby to induce some precipitation and to form a sol;

b) gradually adding alkali to said sol to raise the pH to approximately 7, thereby to induce further precipitation and gel the sol or further gel the sol, said gelled sol being a hydrated silica/hydrated alumina composite;

c) separating the gel from the aqueous medium and washing the resulting product to remove dissolved salts; and d) drying the washed product and reducing it in particle size before formulation into said coating composition, with the proviso that if hydrated zirconia is also present in the precipitated composite, the zirconia content is less than about 10% on a dry basis, based on the total dry weight of alumina, silica and zirconia in the composite.

The substrate is conveniently of paper as conventionally used in pressure-sensitive record material, i.e. of a thickness of about 60 to 90 microns and a grammage of about 35 to 90 g m$^{-2}$.

In a preferred embodiment of the process, the gelled sol produced in step (b) above is subjected to a hydrothermal treatment before being separated and washed as specified in step (c) above. The hydrothermal treatment, which is essentially a hot water ageing process, typically involves raising the temperature of the gelled sol, e.g. by steam heating, and maintaining this elevated temperature for a few hours. By way of example, hydrothermal treatment might take place at 100° C. for four hours, or 80° C. for eight hours. Temperatures higher than 100° C. can be used if pressurized reactor vessels are employed. The use of temperatures higher than 100° C. can be advantageous in that it reduces the time required for the hydrothermal treatment.

The metal silicate solution used is preferably sodium silicate, typically supplied at about 40% to 50% solids content, but then diluted to about 25% solids content. Other silicates could be used instead of sodium silicate, for example potassium silicate. The aluminium salt used is preferably aluminium sulphate, typically at about 25% solids content. The pH of the aluminium salt solution is adjusted to its initial low pH by the addition of an acid, for example 35% sulphuric acid(by weight). This initial low pH is typically about pH 1. The solids content of the acidified aluminium salt solution is typically about 20%. The alkali used for raising the pH in step (b) is preferably sodium hydroxide, for example 10N sodium hydroxide.

Separation of the gel from the aqueous medium is conveniently done by filtration, for example in a standard plate filter press at high pressure, for example 2 MPa (20 Bar). The degree of subsequent washing of the separated gel is determined partly by reference to the technical performance of the product, and partly by economic factors. Whilst washing until substantially all dissolved salts have been removed gives the best technical performance, prolonged washing carries with it a cost penalty, and a compromise between cost and technical benefit may be necessary. Conductivity measurements on the wash water provide a convenient means of monitoring the extent of removal of dissolved salts. Removal of substantially all dissolved salts is typically indicated by a wash-water conductivity of 500 to 1000 $\mu$S cm$^{-1}$ ($\mu$S=micro-Siemens), although this depends to some extent on the hardness or purity of the water used for washing.

The washed filter cake typically has a solids content of about 25 to 30% w/w and is hard enough to be broken into a pseudo-powder by passing through a mechanical breaker, after which it is ready for drying. This can be carried out, for example, using a fluidized bed dryer, for example with inlet and exhaust temperatures of 130° C. and 60° C. respectively. The dryer is preferably arranged to shut down automatically when a predetermined exhaust temperature is reached, this temperature being indicative of the desired product dryness having been reached.

Reduction of the particle size of the composite can be achieved, for example, by an initial dry grinding step in a hammer mill to a particle size such that 95% of particles are of a size below 100 $\mu$m, followed by slurrying and ball mill treatment, typically to a median particle size of about 4 to 6 $\mu$m (as measured by a laser light scattering particle size analyser).

The resulting reduced particle size product may be dried, e.g. for bagging, or may be stored in a tank as a slurry of, say, 45% solids content, prior to formulation into a coating composition. The coating composition typically contains one or more diluent pigment materials, for example kaolin and/or calcium carbonate, and one or more binders, for example styrene-butadiene or another latex and/or carboxymethylcellulose (CMC).

The alumina content of the composite may if desired be increased by a secondary precipitation of alumina on to a hydrated silica produced as defined in steps (a) to (d) of the present process. This can enhance the fade resistance of the colour developed in use, but the benefit obtained has to be balanced against the additional process cost involved. The present hydrated silica/hydrated alumina composite can, if desired, be used in admixture with conventional colour developers, particularly acid clay colour developers such as acid-washed dioctahedral montmorillonite clays.

The hydrated silica/hydrated alumina composite may if desired be modified by the presence of relatively small amounts (normally not more than about 10% by weight, and preferably well below this level) of other hydrated metal oxides, for example zinc, copper, nickel, zirconium, or any of the other metals disclosed in European Patent Applications 42265 A and 42266 A. Such hydrated metal oxides are conveniently precipitated on to previously-formed hydrated silica/hydrated alumina composite or are coprecipitated from the metal salt solution during the precipitation of the hydrated silica/hydrated alumina composite.

When the metal silicate solution is added gradually to the acidified aluminium sulphate solution, so as to raise the pH from an initial value of, say, 1.0 to a final value of, say, 4.0, a certain amount of precipitation occurs and the result is a metastable sol of relatively low viscosity. Whilst there is an increase in viscosity as the pH is raised from 1.0 to 4.0, this viscosity increase is manageable, and can be handled by strong stirring. On gradual addition of alkali to raise the pH to 7, gelling occurs. Thus it is normally necessary to add dilution water before pumping the gel to a filter press or other separating apparatus. On drying of the filtered and washed gel, the initial gel structure collapses and is converted from a hydrogel to a more dense xerogel. This xerogel is then susceptible to dry grinding and/or wet milling to reduce its particle size to any desired value.

Hydrothermal treatment of the gel prior to drying results in the gel being converted to a more robust material by the cementing together of the primary particles which make up the gel. The degree of cementing which occurs is determined primarily by the duration and temperature of the hydrothermal treatment.

The alumina content of the hydrated silica/hydrated alumina composite and the use of hydrothermal treatment significantly influences the properties of the final composite. This is best illustrated by reference to a precipitated product having zero alumina content (i.e.

pure silica) made in a manner analogous to that used to produce the present hydrated silica/hydrated alumina composite, i.e. by precipitation of silica by gradual addition of metal silicate solution on to an aqueous acid medium initially at a pH below 4 and then raising the pH by addition of alkali. Such a pure silica product has good colour development properties, but the colour produced fades rapidly, and high viscosity or gelling is a problem.

When the composite includes a relatively low level of alumina, say up to about 6% and is produced as described in steps (a) and (b) of the present process as defined above, the viscosity of the final product is easier to control, and fade resistance is improved (changes in fade resistance depend not only upon alumina content but also on the physico-chemical structure of the composite—thus the statement that the inclusion of a relatively low level of alumina leads to improved fade resistance is predicated on there being no significant change in physico-chemical structure which might distort the comparison).

If the alumina level of the composite is above a certain critical threshold, typically about 6% alumina, it is found that on drying its structure collapses and the mean pore size falls dramatically. This results in much worse colour developer performance.

Generally, it is found that a sharp viscosity rise is experienced in step (b) of the process (raising the pH from approximately 4 to approximately 7) when the alumina content of the final composite is below about 10%. Thus an alumina content of at least about 10% is preferable from a rheological point of view.

Hydrothermal treatment has the effect of preventing or inhibiting this structural collapse of the composite on drying and leading to a final product of higher pore volume and surface area. As a result of hydrothermal treatment, the loss of developer performance otherwise experienced at alumina levels above about 6% is avoided. Thus the net effect of hydrothermally treating a high alumina content material (say above about 10% alumina) is both good colour developer performance and good fade resistance. It has also been found that hydrothermally treated products have acceptable rheological properties, even though they have somewhat higher viscosities than an otherwise similar product which has not been hydrothermally treated.

Taking the various factors discussed above into account, the optimum alumina content of the composite is considered to be in the range 10% to 30%, with an alumina content of about 20% currently being preferred.

In the above discussion, and in the remainder of this specification, references to alumina content are to the alumina content on a dry basis based on the total dry weight of silica and alumina.

By way of illustration of the above, it was found in a specific experiment that when hydrothermal treatment was not employed, the presence of a small amount (2%) of alumina resulted in a lower specific surface area (about 450 $m^2g^{-1}$) than if no alumina at all were present (about 550 $m^2g^{-1}$). However, increasing the alumina content to about 4 to 6% resulted in an increase in specific surface area to a level (about 550 $m^2g^{-1}$) comparable to that if no hydrated alumina is present. Increasing the alumina content still further resulted in a sharp fall in specific surface area to about 400 $m^2g^{-1}$ at 8% alumina and 250 $m^2g^{-1}$ at 10% and 15% alumina content. In the absence of hydrothermal treatment, the mean pore volume ranged from about 0.7 $cm^3g^{-1}$ at 2% alumina content to about 0.2 $cm^3g^{-1}$ at 10% alumina content, with a further small decrease at higher alumina contents.

It was found in another specific experiment that at 10% alumina content, a composite which had been hydrothermally treated had a considerably greater surface area and pore volume than an otherwise similar product which had not been hydrothermally treated (surface areas of 629 and 325 $m^2 g^{-1}$ respectively and pore volumes of 0.71 and 0.21 $cm^3 g^{-1}$ respectively). At 3.5% alumina content, the surface areas were 461 and 583 $m^2g^{-1}$ for hydrothermal and no hydrothermal treatment respectively, and the pore volumes were 1.01 and 0.60 $cm^3g^{-1}$ respectively. These values are consistent with there being a threshold effect at about 6% alumina content, as discussed previously.

Generally, it is found that the best colour developer performance is obtained when the surface area of the final composite is within the range 600 to 700 $m^2 g^{-1}$, and the pore volume is within the range 0.7 to 1.1 $cm^3 g^{-1}$.

In this specification, surface areas are as measured by the B.E.T. method and mean pore volumes are as measured by the nitrogen adsorption method.

The present record material may be uncoated on its surface opposite to that to which the colour developer composition is applied, or may have a microencapsulated chromogenic material solution on that surface.

When a microencapsulated chromogenic material solution is present, the microcapsules may be produced, for example, by coacervation of gelatin and one or more other polymers, e.g. as described in U.S. Pat. Nos. 2800457; 2800458; or 3041289; or by in situ polymerisation of polymer precursor material, e.g. as decribed in U.S. Pat. Nos. 4001140; and 4105823. The chromogenic materials used in the microcapsules may be, for example, phthalide derivatives, such as 3,3-bis(4-dimethylaminophenyl)-6-dimethylaminophthalide (CVL) and 3,3-bis(1-octyl-2-methylindol-3-yl)phthalide, or fluoran derivatives, such as 2'-anilino-6'-diethylamino-3'-methylfluoran, 6'-dimethylamino-2'-(N-ethyl-N-phenylamino-4'-methylfluoran), - or 3'-chloro-6'-cyclohexylaminofluoran. The solvents used to dissolve the chromogenic materials may be, for example, partially hydrogenated terphenyls, alkyl naphthalenes, diarylmethane derivatives, dibenzyl benzene derivatives, alkyl benzenes or biphenyl derivatives, optionally mixed with diluents or extenders such as kerosene.

The invention will now be illustrated by the following Examples, in which all percentages are by weight:

EXAMPLE 1

This illustrates the production of a hydrated silica/hydrated alumina composite of 10% hydrated alumina content and its use as colour developer for pressure-sensitive record material. The composite was formed by co-precipitation of hydrated silica and hydrated alumina under acid conditions. Hydrated silica containing no hydrated alumina was also produced for comparison purposes.

In the production of the composite, 400 g of 35% sulphuric acid were supplied to a reactor vessel and 42.3 g of 27% aluminium sulphate solution were added with mild stirring (this quantity of aluminium sulphate was such as to provide an alumina content of 10%). After the addition of aluminium sulphate solution was complete, 400 g of dilution water were added.

In a separate vessel, 1000 g of 40% sodium silicate solution ("P84" supplied by ICI and having an $Na_2O$:$SiO_2$ ratio of 1:3.2) were diluted by the addition of 1000 g water. This diluted sodium silicate solution was added with strong stirring to the sulphuric acid/aluminium sulphate mixture prepared as described above. The resulting product was a metastable hydrated silica/hydrated alumina sol of low viscosity and a pH of approximately 4. 10N sodium hydroxide was added slowly to increase the pH to approximately 7 and bring about gel formation.

500 g water was added to this gel to reduce its viscosity. The diluted gel was then filtered and washed to remove dissolved sodium sulphate (a by-product of the reaction between the sodium silicate and aluminium sulphate solutions). Washing was continued until substantially all the sodium sulphate had been removed, as evidenced by the wash water exhibiting a conductivity not greater than 500 $\mu S$ $cm^{-1}$ above that of the washing water (local tap water).

The filtered gel was dried in an oven at 110° C. for sufficient time to reduce its moisture content to approximately 5% w/w. The gel was converted during drying from a hydrogel to a xerogel. In effect the porous gel structure had collapsed to produce a more dense product.

In the comparison experiment, the procedure was the same except that no aluminium sulphate solution was added.

The B.E.T. specific surface area and the mean pore volume (as measured by nitrogen adsorption) of the xerogel products were as set out in Table 1 below:

TABLE 1

| Alumina Content (%) | Specific Surface Area ($m^2g^{-1}$) | Mean Pore Volume ($cm^3g^{-1}$) |
|---|---|---|
| 10 | 250 | 0.18 |
| 0 | 545 | 1.03 |

It will be seen that the surface area and pore volume values for the 10% alumina content product were much less than those for the pure silica product, indicating that the gel structure had collapsed.

The 0% and 10% alumina content xerogel products were wet milled to particle sizes of 5.0 $\mu m \pm 1.0 \mu m$ (as measured by a Malvern 3600 E laser light scattering particle size analyser) and then formulated in identical amounts into otherwise conventional aqueous colour developer coating compositions also containing kaolin (diluent) and styrene-butadiene latex (binder). The full formulation was as follows:

| xerogel product | 59.5 parts |
| kaolin | 25.5 " |
| latex | 15 " |

The pH of the compositions were adjusted to 9.5 using sodium hydroxide solution. The 0% alumina content product gave rise to a composition of much higher inherent viscosity than the 10% alumina content product. As a result, the solids contents of coating compositions made up to be at the maximum usable viscosity for coating purposes differed substantially as between the 10% and the 0% alumina content products—51% in the case of the 10% alumina content product and only 34% in the case of the 0% alumina content product. When the compositions were coated on to paper at a nominal coatweight of 8 $gm^{-2}$ using a laboratory coater and dried, both the resulting coated papers gave good colour developer performance when made into a couplet with a CB sheet and subjected to pressure.

EXAMPLE 2

This illustrates the use of a process similar to that described in Example 1 but including a hydrothermal treatment after gel formation and before drying of the gel.

The procedure was as described in Example 1 up to and including the stage of adjustment of the pH to 7 by means of sodium hydroxide solution, with resultant gel formation. After this pH adjustment, the temperature of the gel was raised by steam jacket heating and maintained at this temperature for a number of hours. Different batches of the products were treated at different temperatures and/or different times, as detailed below. After the hydrothermal treatment, the gel was filtered, washed and dried as described in Example 1. The B.E.T. specific surface area (SA) and the mean pore volume (PV, as measured by nitrogen adsorption) of the resulting xerogel products produced under different conditions were as set out in Tables 2a and 2b below which also include the data from Example 1 for comparison purposes (RT indicates room temperature, i.e. no hydrothermal treatment):

TABLE 2a

| Temp (°C.) | | 10% Alumina Duration of Treatment (hours) | | | | |
|---|---|---|---|---|---|---|
| | | 0 | 2 | 4 | 6 | 8 |
| RT | SA | — | 250 | — | — | — |
| | PV | — | 0.18 | — | — | — |
| 40 | SA | — | — | 443 | — | 412 |
| | PV | — | — | 0.30 | — | 0.29 |
| 60 | SA | — | 384 | 394 | 330 | 475 |
| | PV | — | 0.25 | 0.29 | 0.29 | 0.39 |
| 80 | SA | — | 495 | 456 | 494 | 552 |
| | PV | — | 0.36 | 0.38 | 0.39 | 0.40 |

TABLE 2b

| Temp (°C.) | | 0% Alumina Duration of Treatment (hours) | | | | |
|---|---|---|---|---|---|---|
| | | 0 | 2 | 4 | 6 | 8 |
| RT | SA | 545 | 439 | — | — | — |
| | PV | 1.03 | 1.06 | — | — | — |
| 40 | SA | — | 403 | 405 | 326 | 345 |
| | PV | — | 1.17 | 0.30 | 1.10 | 1.11 |
| 60 | SA | — | — | 334 | 500 | 502 |
| | PV | — | — | 1.06 | 1.33 | 1.42 |
| 80 | SA | — | — | 331 | 323 | 331 |
| | PV | — | — | 1.09 | 1.14 | 1.11 |

Although there is a certain amount of scatter in the data, it will be seen in the case of Table 2a (10% alumina) that the effect of hydrothermal treatment is to produce a product of higher surface area and pore volume, and that this effect is particularly marked at higher temperatures and durations of the treatment. By contrast, Table 2b (0% alumina) suggests that hydrothermal treatment produces a lower surface area and a small increase in pore volume, although no consistent pattern really emerges from the data.

As in Example 1, the 0% and 10% alumina content xerogel products were wet milled to a particle size of 5.0 $\mu m \pm 1.0$ $\mu m$ and then formulated as set out in Example 1 into coating compositions, which were laboratory coated and dried. As with Example 1, the 0% alumina content product was found to give rise to a much higher viscosity composition than the 10% alumina content product, and the maximum solids content coating composition which was usable was less for the 0% alumina content composition than for the 10% alumina content composition (33% compared with 49%). Both coated products gave good colour developer properties when tested by being made into a couplet with a CB sheet and subjected to pressure. The test used was the so-called calender intensity (C.I.) test conventional in the art.

The calender intensity test involved superimposing strips of paper coated with encapsulated colour former solution onto a strip of the coated paper under test, passing the superimposed strips through a laboratory calender to rupture the capsules and thereby produce a colour on the test strip, measuring the reflectance of the thus coloured strip (I) and expressing the result ($I/I_o$) as a percentage of the reflectance of an unused control strip ($I_o$). Thus the lower the calender intensity value ($I/I_o$) the more intense the developed colour.

The calender intensity tests were done with two different commercially available CB papers, designated hereafter as Papers A and B, which employed different colour former blends.

The reflectance measurements were done both two minutes after calendering and forty-eight hours after calendering, the sample being kept in the dark in the interim. The colour developed after two minutes is primarily due to rapid-developing colour formers in the colour former blend, whereas the colour after forty-eight hours derives also from slow-developing colour formers in the blend (fading of the colour from the rapid-developing colour formers also influences the intensity achieved).

The results of this testing are set out below in Tables 2c and 2e for Paper A and Tables 2d and 2f for Paper B:

TABLE 2c

| | | 10% Alumina - Paper A | | | | |
|---|---|---|---|---|---|---|
| Temp. | C.I. | Duration of Treatment (hours) | | | | |
| (°C.) | Conditions | 0 | 2 | 4 | 6 | 8 |
| RT | 2 min | 68.3 | 65.7 | 59.6 | — | 63.5 |
| | 48 hours | 56.0 | 60.8 | 50.1 | — | 54.6 |
| 40 | 2 min | — | 65.2 | 72.1 | 66.9 | 65.0 |
| | 48 hours | — | 50.3 | 59.0 | 54.5 | 56.4 |
| 60 | 2 min | — | 69.0 | 65.9 | 62.0 | 63.4 |
| | 48 hours | — | 57.7 | 52.1 | 52.9 | 53.3 |
| 80 | 2 min | — | 64.8 | 62.4 | 60.8 | 59.0 |
| | 48 hours | — | 52.0 | 49.0 | 50.1 | 51.0 |

TABLE 2d

| | | 10% Alumina - Paper B | | | | |
|---|---|---|---|---|---|---|
| Temp. | C.I. | Duration of Treatment (hours) | | | | |
| (°C.) | Conditions | 0 | 2 | 4 | 6 | 8 |
| RT | 2 min | 65.4 | 63.0 | 56.9 | — | 62.0 |
| | 48 hours | 53.8 | 56.7 | 45.8 | — | 53.0 |
| 40 | 2 min | — | 62.7 | 65.8 | 65.3 | 62.3 |
| | 48 hours | — | 49.9 | 55.6 | 54.2 | 55.0 |
| 60 | 2 min | — | 65.2 | 64.6 | 60.9 | 61.5 |
| | 48 hours | — | 53.2 | 52.2 | 51.1 | 52.4 |
| 80 | 2 min | — | 62.2 | 59.9 | 58.8 | 56.4 |
| | 48 hours | — | 50.5 | 49.1 | 50.0 | 50.5 |

TABLE 2e

| | | 0% Alumina - Paper A | | | | |
|---|---|---|---|---|---|---|
| Temp. | C.I. | Duration of Treatment (hours) | | | | |
| (°C.) | Conditions | 0 | 2 | 4 | 6 | 8 |
| RT | 2 min | — | — | — | — | 57.3 |
| | 48 hours | — | — | — | — | 47.6 |
| 40 | 2 min | — | 57.7 | 58.5 | 58.2 | 58.2 |
| | 48 hours | — | 44.2 | 52.7 | 46.8 | 44.8 |
| 60 | 2 min | — | 57.7 | 59.8 | 59.5 | 62.5 |
| | 48 hours | — | 44.7 | 46.6 | 45.8 | 45.7 |
| 80 | 2 min | — | 60.7 | 59.6 | 59.8 | 60.6 |
| | 48 hours | — | 46.3 | 44.2 | 48.3 | 46.7 |

TABLE 2f

| | | 0% Alumina - Paper B | | | | |
|---|---|---|---|---|---|---|
| Temp. | C.I. | Duration of Treatment (hours) | | | | |
| (°C.) | Conditions | 0 | 2 | 4 | 6 | 8 |
| RT | 2 min | — | — | — | — | 55.2 |
| | 48 hours | — | — | — | — | 45.3 |
| 40 | 2 min | — | 55.0 | 55.2 | 56.0 | 54.8 |
| | 48 hours | — | 43.2 | 51.0 | 44.6 | 43.4 |
| 60 | 2 min | — | 55.0 | 55.4 | 56.4 | 58.7 |
| | 48 hours | — | 43.8 | 42.9 | 44.1 | 44.4 |
| 80 | 2 min | — | 57.2 | 56.8 | 56.7 | 56.4 |
| | 48 hours | — | 44.2 | 42.2 | 45.4 | 43.5 |

It will be seen that at 10% alumina content there is a gradual improvement in colour developing performance when the hydrothermal treatment takes palce at a temperature of 60° C. or more. The best colour developer performance was achieved with hydrothermal treatment at 80° C. for 8 hours.

By contrast hydrothermal treatment of the 0% alumina content product had little effect.

EXAMPLE 3

This illustrates the effect of different alumina levles in the case of a composite which has not been tydrothermally treated. The procedure was as described in Example 1 except that the quantities of aluminium sulphate solution added were 7.8, 15.9, 24.3, 33.1 and 67.2 g, so as to give alumina contents of 2, 4, 6, 8 and 15%. The B.E.T. specific surface area and nitrogen adsorption mean pore volumes of the products obtained are set out in Table 3 below:

TABLE 3

| | Alumina Content (%) | | | | |
|---|---|---|---|---|---|
| | 2 | 4 | 6 | 8 | 15 |
| Specific Surface Area ($m^2 g^{-1}$) | 461 | 552 | 534 | 397 | 248 |
| Mean Pore Volume ($cm^3 g^{-1}$) | 0.71 | 0.56 | 0.48 | 0.31 | 0.16 |

It will be seen that at above about 6% alumina content, the surface area and proe volume fall substantially, indicating collapse of the gel structure (in the absence of hydrothermal treatment).

EXAMPLE 4

This illustrates the effect of hydrothermal treatment on products produced as described in Example 3 above. The hydrothermal treatment was as generally described in Example 2, except that it was at 100° C. for 4 hours. The BET specific surface area and nitrogen absorption mean pore volumes of the products obtained are set out in Table 4 below.

TABLE 4

| | Alumina Content (%) | | | | |
|---|---|---|---|---|---|
| | 2 | 4 | 5 | 8 | 15 |
| Specific Surface Area ($m^2g^{-1}$) | 534 | 482 | 515 | 422 | 500 |
| Mean Pore Volume ($cm^3g^{-1}$) | 1.15 | 0.84 | 0.79 | 0.31 | 0.35 |

It will be seen on comparing the data in Table 4 (hydrothermal treatment) with that of Table 3 (no hydrothermal treatment) that hydrothermal treatment results in a product of higher surface area and pore volume, especially at alumina contents higher than 6%.

EXAMPLE 5

This illustrates the use of a second addition of alumina after the preparation of an initial hydrated silica/hydrated alumina composite.

The procedure is as described in Example 1 up to the stage of milling to produce an alumina xerogel product of a particle size of 5.0 μm±1.0 μm, except that only 7.8 g of 27% aluminium sulphate solution is used, so as to produce a hydrated alumina content of 2%.

The solids content of the milled slurry is then adjusted to 40%. 400 g of this 40% slurry is then adjusted to a pH below 7 by addition of sulphuric acid (the purpose of this acidification is to prevent premature precipitation of alumina). 50 g of 27% aluminium sulphate solution is then added, and the mixture is then slowly neutralized with 30% sodium hydroxide solution until a pH of 7 is reached. This results in precipitation of alumina at a level of 4%, giving a total alumina content of 6% (2% in the initial composite plus 4% added as a secondary addition).

The resultant mixture is then washed to remove sodium sulphate, using a filter press, and dried. Drying after secondary alumina addition has no effect on the structure of the composite, i.e. no collapsing occurs.

EXAMPLE 6

This illustrates the production and evaluation of a series of batches of 10% alumina content hydrothermally treated hydrated silica/hydrated alumina composite on a larger scale than in previous examples.

The procedure was generally as described in Examples 1 and 2 except that the quantities employed for each batch were as follows:

| | |
|---|---|
| 27% Aluminium sulphate solution | 120 Kg |
| 35% Sulphuric acid | 90 Kg |
| 40% Sodium silicate solution ("P84") | 280 Kg |
| 10N Sodium hydroxide | 25 Kg (approx) |

The dilution water additions were 150 Kg to the acidified aluminium sulphate solution and 180 Kg to the sodium silicate solution.

The hydrothermal treatment was carried out at 100° C. for 4 hours.

The specific surface area and mean pore volume of four batches of the resulting product were as follows:

| Batch No. | Surface Area ($m^2g^{-1}$) | Mean Pore Volume ($cm^3g^{-1}$) |
|---|---|---|
| 1 | 308 | 0.86 |
| 2 | 679 | 0.58 |
| 3 | 760 | 0.62 |
| 4 | 662 | 0.59 |

When all the batches (i.e. not just the four referred to above) were mixed the mean surface area of the mixture was 807 $m^2g^{-1}$ and the mean pore volume was 0.96.

The product was then formulated into a colour developer composition in admixture with a conventional acid-washed montmorillonite colour developing clay. The composition was then blade-coated onto a base paper and dried in conventional fashion. The product gave good colour developer performance when used in a couplet with a conventional CB paper, and the colour developed showed good resistance to fading.

EXAMPLE 7

This illustrates the effect of different alumina levels (ranging from 0% to 15%) on the imaging performance of the present composite, both when hydrothermal treatment is carried out and when it is not.

Water, sulphuric acid (35%) and aluminium sulphate solution (27%) were introduced into a reactor vessel in the amounts shown in Table 7a below, these amounts being such as to give a mixture of approximately 20% solids content. 40% sodium silicate solution ("P84") was diluted in a separate reaction vessel with its own weight of water to give a solids content of approximtely 20% and was then introduced slowly (50 ml/min.) with stirring to the acidified aluminium sulphate mixture in an amount as shown in Table 7a below. The relative amounts of acidified aluminium sulphate solution and sodium silicate solution were chosen such as to achieve the propertions of hydrated alumina and hydrated silica desired in the final composite.

TABLE 7a

| Alumina Content (%) | Aluminium Sulphate (27%) (g) | Sulphuric Acid (35%) (g) | Water (g) | Sodium Silicate (20%) (g) |
|---|---|---|---|---|
| 0 | 0.0 | 220.5 | 220.0 | 1000.0 |
| 2 | 38.6 | 195.1 | 233.0 | 1000.0 |
| 4 | 78.7 | 168.6 | 247.0 | 1000.0 |
| 6 | 120.6 | 141.0 | 261.0 | 1000.0 |
| 8 | 164.3 | 112.2 | 276.0 | 1000.0 |
| 10 | 210.0 | 82.1 | 292.0 | 1000.0 |
| 15 | 333.5 | 82.1 | 416.0 | 1000.0 |

The pH of the mixture was monitored continuously while the sodium silicate solution was being introduced. When all the sodium silicate had been added, the pH was about 4.0 in each case (±0.2), and some precipitation (of a sol) had occurred. 10 N sodium hydroxide solution was then slowly added, whilst maintaining stirring until a pH of 7.0±0.2 was reached. For the mixtures of final alumina contents up to 6%, a rapid gel formation stage was observed, and water was added to keep the viscosity at a workably low level, i.e. a level such that the stirrer could still function properly. For the mixtures of final alumina contents of 8% and above, the increase in viscosity associated with the gel stage was much more manageable, and addition of dilution water proved unnecessary.

A control was also run with no aluminium sulphate present, so as to give a 0% alumina (pure silica) product which had been produced in the same general manner as the hydrated silica/hydrated alumina composites.

The final gel product in each case was divided into two portions, one of which was subjected to hydrothermal treatment and the other of which was not. The hydrothermal treatment consisted of heating by means of a hot plate to 100° C. over a 30 minute period, followed by maintenance of this temperature for 4 hours.

The various hydrothermally treated and non-hydrothermally treated products were each filtered, and the resulting solid filter cakes were washed with tap water to remove sodium sulphate until the wash water had the same conductivity as that of the tap water used for the washing. The washed filter cakes were then broken up and oven dried to a 10% moisture content. Following this, the dried composites were each re-slurried in water at a solids content of 40% and milled in a Pascall mill until the mean particle size was 4 μm (measured as in Example 1). The milled 40% solids content slurries were retained for formulation into coating compositions.

These coating compositions were prepared in each case by adding 14.1 g of styrene-butadiene latex (50% solids content) to 100 g of 40% slurry, giving a latex level of 15% based on the total dry weight of hydrated silica/hydrated alumina composite and latex. The coating compositions were then coated on to a conventional 48 g m$^{-2}$ base paper by means of a laboratory coater at an coatweight of 8 g m$^{-2}$.

The resulting papers were then calender intensity tested as described in Example 1 with two different commercially available CB papers, designated Papers C and D, which employed different colour developer blends. In addition a fading test was carried out. This involved positioning the developed strips (after forty-eight hours development) in a cabinet in which were an array of daylight fluorescent striplamps. This is thought to simulate, in accelerated form, the fading which a print might undergo under normal conditions of use. After exposure for the desired time, measurements were made as described with reference to the calender intensity test, and the results were expressed in the same way.

The results obtained are set out in Tables 7b to 7e below, in which "Delta" designates the difference between the calender intensity after 48 hours dark development and after an additional 30 hours in the fade cabinet, and is thus a measure of the amount of fading which has occurred.

TABLE 7b

| Alumina Level (%) | Paper C - No Hydrothermal Treatment | | | | | | |
|---|---|---|---|---|---|---|---|
| | C.I. Value | | Fade Data | | | | |
| | 2 min | 48 hr | 5 hr | 10 hr | 15 hr | 30 hr | Delta |
| 0 | 47.3 | 37.9 | 61.4 | 76.6 | 84.0 | 92.0 | 54.1 |
| 2 | 51.2 | 43.3 | 68.2 | 83.1 | 87.9 | 91.8 | 48.5 |
| 4 | 51.8 | 46.0 | 70.1 | 83.5 | 88.5 | 92.0 | 46.0 |
| 6 | 48.9 | 40.4 | 65.5 | 82.6 | 87.6 | 91.7 | 51.3 |
| 8 | 46.6 | 37.9 | 57.3 | 76.7 | 81.3 | 86.7 | 48.8 |
| 10 | 48.2 | 41.0 | 63.7 | 81.6 | 87.0 | 90.6 | 49.6 |
| 15 | 60.5 | 55.4 | 61.8 | 69.9 | 75.2 | 82.3 | 26.9 |

TABLE 7c

| Alumina Level (%) | Paper C - Hydrothermal Treatment | | | | | | |
|---|---|---|---|---|---|---|---|
| | C.I. Value | | Fade Data | | | | |
| | 2 min | 48 hr | 5 hr | 10 hr | 15 hr | 30 hr | Delta |
| 0 | 51.0 | 39.1 | 58.3 | 72.5 | 81.5 | 90.0 | 50.9 |
| 2 | 50.8 | 38.4 | 59.0 | 74.8 | 82.1 | 88.5 | 50.1 |
| 4 | 49.9 | 40.8 | 54.3 | 68.8 | 77.4 | 84.7 | 43.9 |
| 6 | 48.1 | 37.6 | 55.1 | 71.8 | 80.8 | 85.5 | 47.9 |

TABLE 7c-continued

| Alumina Level (%) | Paper C - Hydrothermal Treatment | | | | | | |
|---|---|---|---|---|---|---|---|
| | C.I. Value | | Fade Data | | | | |
| | 2 min | 48 hr | 5 hr | 10 hr | 15 hr | 30 hr | Delta |
| 8 | 46.0 | 34.9 | 48.1 | 62.0 | 70.8 | 77.5 | 42.6 |
| 10 | 47.3 | 38.6 | 48.5 | 62.0 | 71.9 | 79.5 | 40.9 |
| 15 | 50.7 | 39.1 | 47.2 | 58.6 | 64.0 | 72.2 | 33.1 |

TABLE 7d

| Alumina Level (%) | Paper D - No Hydrothermal Treatment | | | | | | |
|---|---|---|---|---|---|---|---|
| | C.I. Value | | Fade Data | | | | |
| | 2 min | 48 hr | 5 hr | 10 hr | 15 hr | 30 hr | Delta |
| 0 | 46.1 | 33.9 | 56.7 | 70.0 | 77.3 | 88.0 | 54.1 |
| 2 | 46.0 | 35.2 | 59.3 | 74.1 | 81.2 | 87.8 | 52.6 |
| 4 | 46.4 | 36.0 | 57.8 | 70.3 | 77.6 | 83.7 | 47.7 |
| 6 | 42.8 | 37.7 | 47.5 | 61.5 | 71.4 | 81.3 | 43.6 |
| 8 | 43.1 | 34.5 | 47.5 | 62.5 | 70.9 | 81.3 | 46.8 |
| 10 | 42.2 | 33.9 | 48.6 | 63.8 | 73.8 | 82.1 | 48.2 |
| 15 | 59.8 | 53.5 | 58.8 | 66.9 | 73.3 | 80.2 | 26.7 |

TABLE 7e

| Alumina Level (%) | Paper D - Hydrothermal Treatment | | | | | | |
|---|---|---|---|---|---|---|---|
| | C.I. Value | | Fade Data | | | | |
| | 2 min | 48 hr | 5 hr | 10 hr | 15 hr | 30 hr | Delta |
| 0 | 44.5 | 33.7 | 54.4 | 64.3 | 70.9 | 77.6 | 43.9 |
| 2 | 40.0 | 31.6 | 45.3 | 58.3 | 67.2 | 78.2 | 46.6 |
| 4 | 43.6 | 33.7 | 48.9 | 59.2 | 65.0 | 74.5 | 40.8 |
| 6 | 39.7 | 30.6 | 45.7 | 57.6 | 65.1 | 74.6 | 44.0 |
| 8 | 41.4 | 30.4 | 43.8 | 56.5 | 63.5 | 72.8 | 42.4 |
| 10 | 38.7 | 30.1 | 39.9 | 48.7 | 55.5 | 63.8 | 33.7 |
| 15 | 44.3 | 36.8 | 44.3 | 55.0 | 61.6 | 71.9 | 35.1 |

Although there is a certain amount of scatter in the data, it will be seen that hydrothermal treatment enhanced the colour developing performance of the composite products when tested with both papers C and D. The effect of hydrothermal treatment was most marked at 15% alumina content. The best colour developer performance was observed at alumina contents in the range 6 to 10% for both Papers C and D. For the pure silica control (i.e. 0% alumina content), good initial colour developer performance was observed, but the image faded badly. The alumina-containing samples showed better resistance to fading, at least with alumina contents above 2%, this improved fade resistance being particularly noticeable at higher alumina contents and especially at 15% alumina content.

EXAMPLE 8

This illustrates the effect of a higher range of alumina contents than in previous Examples, both when hydrothermal treatment is carried out and when it is not.

The procedure used to prepare the hydrated silica/hydrated alumina composites was as described in Example 7, except that different quantities of material were used, as set out in Table 8a below, and that no control was run with 0% alumina content.

TABLE 8a

| Alumina Content (%) | Aluminium Sulphate (27%) (g) | Sulphuric Acid (35%) (g) | Water (g) | Sodium Silicate (20%) (g) |
|---|---|---|---|---|
| 10 | 42.0 | 16.4 | 48.4 | 200.0 |
| 20 | 94.5 | 16.4 | 110.9 | 200.0 |
| 30 | 162.0 | 16.4 | 178.4 | 200.0 |

TABLE 8a-continued

| Alumina Content (%) | Aluminium Sulphate (27%) (g) | Sulphuric Acid (35%) (g) | Water (g) | Sodium Silicate (20%) (g) |
|---|---|---|---|---|
| 40 | 252.0 | 16.4 | 268.4 | 200.0 |

The resulting paper was tested as described in Example 7, except that a single fade measurement was made after a period of 24 hours in the fade cabinet, and different commercially-available CB papers were used (Papers E and F). The results are shown in Table 8b below, which also includes data on the particle sizes of hydrated silica/hydrated alumina composites in the final slurries and the solids content and viscosity of those slurries.

TABLE 8b

| % Al$_2$O$_3$ | 10% | | 20% | | 30% | | 40% | |
|---|---|---|---|---|---|---|---|---|
| | HT | NHT | HT | NHT | HT | NHT | HT | NH |
| Paper E | | | | | | | | |
| 2 Min. C.I. | 39.2 | 40.2 | 44.6 | 45.3 | 55.4 | 71.5 | 41.9 | 52.6 |
| 48 Hr. C.I. | 30.7 | 32.5 | 33.8 | 34.7 | 45.6 | 54.4 | 33.2 | 41.9 |
| Fade- | | | | | | | | |
| 24 Hr. | 73.7 | 70.8 | 55.8 | 60.1 | 75.5 | 82.0 | 69.3 | 75.9 |
| Delta | 43.0 | 38.3 | 22.0 | 25.4 | 29.9 | 27.6 | 36.1 | 34.0 |
| Paper F | | | | | | | | |
| 2 Min. C.I. | 44.1 | 44.8 | 49.4 | 50.1 | 63.4 | 80.3 | 48.9 | 62.0 |
| 48 Hr. C.I. | 36.7 | 37.1 | 35.5 | 38.3 | 49.3 | 61.4 | 39.3 | 46.6 |
| Fade- | | | | | | | | |
| 24 Hr. | 70.5 | 67.3 | 55.8 | 52.3 | 73.2 | 84.9 | 75.2 | 75.3 |
| Delta | 33.8 | 30.2 | 20.3 | 14.0 | 23.9 | 23.5 | 35.9 | 28.7 |
| Particle Size (μm) | 3.3 | 3.3 | 2.9 | 4.6 | 3.2 | 4.3 | 3.9 | 4.8 |
| Solids Content (%) | 33.6 | 40.3 | 29.9 | 33.3 | 39.7 | 38.6 | 38.5 | 38.5 |
| Viscosity (cP) | 71.9 | 18.3 | 62.8 | 14.3 | 18.3 | 10.4 | 37.1 | 11.1 |

Key:
HT = Hydrothermally Treated
NHT = Not Hydrothermally Treated

It will be seen that hydrothermal treatment enhanced the colour developing performance of the composite product, particularly at higher alumina contents. The best fade resistance was observed at 20% alumina content.

EXAMPLE 9

This further illustrates the production of hydrated silica/hydrated alumina composites containing 10% and 20% alumina, and describes the colour developer performance of these composites in relation to three specific chromogenic materials as well as in relation to commercially-available CB papers.

The procedure used to produce the composites and colour developer sheets was as described in Example 8. The 10% alumina content material was found on testing to have a surface area (B.E.T.) of 686 g m$^{-2}$ and a mean pore volume (nitrogen adsorption) of 1.01 cm$^3$g$^{-1}$. The corresponding figures for the 20% alumina content product were 617 g m$^{-2}$ and 0.72 cm$^3$ g$^{-1}$.

Colour developer sheets were prepared and tested by the methods described earlier, using papers E and F as in Example 8 and also respective special test CB papers coated with microcapsules containing solutions of the following chromogenic materials in (solvent?)

Chromogen 1 - CVL (fast-developing blue)
Chromogen 2 - N-butylcarbazol-3-yl-bis(4-N-methyl-N-phenylaminophenyl)methane (slow developing blue)
Chromogen 3 - 3'-i-propyl-7-dibenzylamino-2,2'-spiro-bi-{2H-1-benzopyran} (fast developing blue with most colour developers).

The results obtained are set out in Table 9 below:

TABLE 9

| % Al$_2$O$_3$ | 10% | 20% |
|---|---|---|
| Chromogen 1 | | |
| 2 min C.I. | 44.5 | 44.5 |
| 48 hr C.I. | 40.2 | 40.3 |
| 1 hr fade | 49.5 | 44.1 |
| 5 hr fade | 78.9 | 61.7 |
| 10 hr fade | 93.9 | 79.5 |
| 16 hr fade | 98.0 | 92.0 |
| Delta | 57.8 | 51.7 |
| Chromogen 2 | | |
| 2 min C.I. | —* | —* |
| 48 hr C.I. | 70.9 | 56.4 |
| 1 hr fade | 63.5 | 49.5 |
| 5 hr fade | 62.0 | 48.4 |
| 10 hr fade | 62.7 | 49.2 |
| 16 hr fade | 70.5 | 54.8 |
| Delta | — | — |
| Chromogen 3 | | |
| 2 min C.I. | 83.6 | 72.5 |
| 48 hr C.I. | 64.2 | 59.8 |
| 1 hr fade | 85.0 | 67.1 |
| 5 hr fade | 96.0 | 83.1 |
| 10 hr fade | 100.0 | 92.0 |
| 16 hr fade | 100.0 | 98.0 |
| Delta | 35.8 | 38.2 |
| Paper E | | |
| 2 min C.I. | 43.6 | 43.2 |
| 48 hr C.I. | 35.7 | 37.0 |
| 1 hr fade | 42.0 | 40.7 |
| 5 hr fade | 60.8 | 53.0 |
| 10 hr fade | 74.7 | 62.6 |
| 16 hr fade | 84.0 | 74.7 |
| Delta | 48.3 | 37.7 |
| Paper F | | |
| 2 min C.I. | 48.0 | 50.4 |
| 48 hr C.I. | 38.7 | 42.1 |
| 1 hr fade | 45.3 | 44.8 |
| 5 hr fade | 70.5 | 55.7 |
| 10 hr fade | 84.3 | 68.2 |
| 16 hr fade | 88.5 | 80.0 |
| Delta | 49.8 | 37.9 |

*No image was visible, and so no measurement was made.

It will be seen that the 20% alumina sample showed initial reactivity and/or fade resistance benefits with all the papers tested.

EXAMPLE 10

This illustrates the effect of modifying the initially-formed composite by the inclusion of small amounts of hydrated oxides of other metals, namely nickel, zirconium and zinc, and also by the inclusion of an additional amount of hydrated alumina.

A 46% solids content slurry of the 10% alumina content composite prepared in Example 6 was made up. Five 250 g portions of this slurry were taken, and a metal salt was added to each of them. These salts were as follows:

Portion 1 - 5.2 g nickel sulphate (dry NiSO$_4$.6H$_2$O)
Portion 2 - 16.3 g zirconium oxychloride (dry ZrOCl$_2$.8H$_2$O)
Portion 3 - 20.3 g zinc sulphate (dry ZnSO$_4$.7H$_2$O)
Portion 4 - 108.6 g aluminium sulphate (27% aqueous solution)

The remaining portion was used as a control, without any metal salt addition. The quantities of metal salt chosen were such as to give an addition level of 4% for the zirconium, zinc and aluminum hydrated oxides, and 1% for the hydrated nickel oxide, based in each case on the total weight of hydrated silica/hydrated alumina composite and hydrated metal oxide. After addition of the metal salts, precipitation of the hydrated oxide was brought about by addition of sodium hydroxide solution until a neutral pH was achieved. The resulting product was filtered, washed to remove any dissolved salts, dried, re-slurried and filled to a mean particle size of 4 $\mu$m. A coating formulation was then prepared as described in Example 7 and coated sheets were prepared and tested, also as described in that Example, except that the test sheets were Papers D and the special CB papers containing Chromogens 1, 2 and 3 as described in Example 9.

TABLE 10

| Treating Metal | C.I. Value | | Fade Data | | | |
|---|---|---|---|---|---|---|
| | 2 min | 48 hr | 5 hr | 10 hr | 30 hr | Delta |
| Paper D | | | | | | |
| Ni | 40.3 | 37.4 | 39.6 | 44.2 | 62.0 | 24.6 |
| Zr | 42.7 | 34.6 | 46.1 | 56.0 | 68.2 | 33.6— |
| Zn | 41.3 | 31.3 | 44.8 | 56.3 | 74.0 | 42.7 |
| Al | 42.3 | 36.2 | 48.8 | 57.7 | 71.1 | 34.9 |
| None | 44.6 | 38.7 | 58.5 | 66.9 | 78.8 | 40.1 |
| Chromogen 1 | | | | | | |
| Ni | 45.6 | 42.0 | 48.1 | 58.5 | 90.7 | 48.7 |
| Zr | 46.3 | 41.2 | 65.9 | 83.5 | 98.0 | 56.8— |
| Zn | 43.7 | 38.9 | 64.2 | 85.2 | 96.5 | 57.6 |
| Al | 47.0 | 43.1 | 65.9 | 86.8 | 98.0 | 54.9 |
| None | 55.5 | 53.5 | 79.8 | 93.5 | 99.0 | 45.5 |
| Chromogen 2 | | | | | | |
| Ni | — | 96.9 | 48.9 | 48.4 | 49.7 | — |
| Zr | — | 86.0 | 48.2 | 48.7 | 52.3 | — |
| Zn | — | 97.6 | 58.4 | 58.2 | 61.3 | — |
| Al | — | 87.3 | 52.2 | 53.3 | 55.8 | — |
| None | — | 94.7 | 61.6 | 62.0 | 63.9 | — |
| Chromogen 3 | | | | | | |
| Ni | 82.2 | 61.0 | 79.3 | 89.8 | 98.0 | 37.0 |
| Zr | 73.5 | 58.1 | 77.6 | 88.1 | 99.0 | 40.9— |
| Zn | 82.1 | 59.0 | 76.7 | 91.1 | 99.0 | 40.0 |
| Al | 74.9 | 59.3 | 72.3 | 85.1 | 98.0 | 38.7 |
| None | 83.8 | 66.9 | 85.3 | 94.5 | 99.0 | 32.1 |

It will be seen that metal modificaiton enhanced the initial colour developing ability with respect to Chromogen 1, Chromogen 3 (slightly), and Paper D (which contained Chromogen 1 and other chromogens), but that only aluminum and zirconium had a significant effect in relation to Chromogen 2. The fade data for Chromogen 1 and Chromogen 3 is of little value, since the image faded completely, although the presence of nickel did have some beneficial effect with Chromogen 1. Chromogen 2 continued to develop after the 48 hour initial period, and the colour intensity after 30 hours fading was greater than after 48 hours development prior to fading. All the metals except zinc enhanced the fade resistance in relation to Paper D. Generally it can be concluded that zinc is of little benefit in preventing fade, but that the other metals tested had a beneficial effect, with nickel being the best.

EXAMPLE 11

This illustrates the effect of modifying the initially-formed composite by the inclusion of small amounts of hydrated oxides of two further metals, namely copper and iron. The experimental procedure was as described in Example 10, except that the addition levels were 0.2%, in order to avoid excessive discolouration of the composite. The salts used were copper sulphate (CuSO$_4$.5H$_2$O) and ferrous sulphate (FeSO$_4$.7H$_2$O), both in dry form, and the quantities of salt used were 0.72 g and 0.89 g respectively. Colour developer papers were prepared and tested as described in Example 7, except that the CB test papers were as described in Example 8. The results obtained were as set out in Table 11 below:

TABLE 11

| Treating Metal | C.I. Value | | Fade Data | | | | |
|---|---|---|---|---|---|---|---|
| | 2 min | 48 hr | 5 hr | 10 hr | 15 hr | 30 hr | Delta |
| Paper E | | | | | | | |
| Cu | 44.5 | 34.6 | 47.8 | 60.5 | 64.7 | 69.6 | 35.0 |
| Fe | 45.5 | 34.3 | 63.2 | 76.5 | 82.9 | 87.8 | 53.5 |
| None | 49.0 | 40.5 | 61.9 | 70.2 | 74.7 | 78.0 | 37.5 |
| Paper F | | | | | | | |
| Cu | 48.1 | 36.4 | 45.7 | 65.6 | 68.4 | 74.8 | 38.4 |
| Fe | 48.4 | 37.9 | 61.9 | 84.0 | 83.5 | 89.4— | 51.5 |
| None | 53.8 | 40.7 | 56.2 | 68.9 | 72.6 | 77.6 | 36.9 |
| Chromogen 1 | | | | | | | |
| Cu | 45.2 | 38.8 | 63.8 | 91.6 | 95.1 | 100.0 | 61.2 |
| Fe | 45.5 | 38.5 | 76.2 | 95.1 | 99.0 | 100.0— | 61.5 |
| None | 50.7 | 46.2 | 81.0 | 94.8 | 99.0 | 100.0 | 53.8 |
| Chromogen 2 | | | | | | | |
| Cu | — | 63.1 | 47.7 | 50.8 | 51.9 | 56.5 | — |
| Fe | — | 71.8 | 57.5 | 65.1 | 67.8 | 82.0— | 10.2 |
| None | — | 80.1 | 61.1 | 60.2 | 62.4 | 65.5 | — |
| Chromogen 3 | | | | | | | |
| Cu | 82.9 | 62.8 | 84.1 | 99.0 | 99.0 | 100.0 | 37.2 |
| Fe | 84.6 | 73.0 | 94.0 | 99.0 | 99.0 | 100.0— | 27.0 |
| None | 84.0 | 66.6 | 83.0 | 96.8 | 99.0 | 100.0 | 33.4 |

The presence of both copper and iron modificaton improved the initial colour developing performance of the composite. Copper was generally beneficial in reducing fade, whereas iron generally had a detrimental effect. As with Example 10, little can be concluded from the fade tests on Chromogen 1 (CVL) and Chromogen 3, since the initial colouration faded completely during the course of the tests.

EXAMPLE 12

This example compares the present record material with record materials produced by the processes disclosed in European Patent Applications Nos. 42265A and 42266A. Two different alumina content composites were chosen for the comparison, namely 3.5% and 10% alumina content.

The prior art composites were produced by introducing sodium silicate ("P84") and water into a reactor vessel in proportions such as to produce a 25% sodium silicate final solution. Aluminum sulphate solution (27%) was added slowly with high shear mixing. The amounts of sodium silicate and aluminum sulphate used (detailed below) were chosen so as to provide the desired alumina contents in the final composites. On completion of the aluminum sulphate addition, sulphuric acid (35%) was added slowly, whilst carefully monitoring the viscosity, which was observed to rise rapidly towards a peak at a certain stage of the acid addition. The addition of sulphuric acid was interrupted and the mixture allowed to continue stirring until the viscosity had fallen and a precipitate had formed. Further sulphuric acid was then added until the pH had fallen to a value between 7 and 8. The resultant precipitate was filtered and washed to remove sodium sulphate and the filter cake was dried, reslurried and milled to a target mean particle size of about 5 $\mu$m.

The composites according to the present invention were prepared by the method described in Example 7.

As in that Example, the initial batches were split into two, and one batch was subjected to hydrothermal treatment (at 100° C. for 4 hours) and the other was not. The final composites were milled to a target mean particle size of about 5 μm. The physical characteristics of the composites and final slurries are set out in Table 12a TABLE 12a

| Al₂O₃ content (%) | Prior Art | | Present Invention | | | |
|---|---|---|---|---|---|---|
| | | | NHT | | HT | |
| | 3.5 | 10.0 | 3.5 | 10.0 | 3.5 | 10.0 |
| Particle Size (μm) | 5.1 | 4.9 | 5.5 | 4.6 | 4.7 | 5.1 |
| Surf. Area (m²g⁻¹) | 132 | 193 | 583 | 325 | 461 | 629 |
| Pore Vol. (cm³g⁻¹) | 0.59 | 0.78 | 0.60 | 0.21 | 1.01 | 0.71 |
| Slurry Solids (%) | 40.0 | 39.8 | 40.0 | 40.0 | 36.5 | 40.0 |
| Haake Viscosity (cP) (at 24000 s-1) | 111.7 | 161.4 | 97.9 | 9.3 | 160.1 | 37.1 |

HT = Hydrothermally treated; NHT = Not Hydrothermally treated the quantities of materials used in the processes described above are set out in Table 12b below:

TABLE 12b

| Alumina Content (%) | Aluminium Sulphate (27%) (g) | Sulphuric Acid (35%) (g) | Water (g) | Sodium Silicate (40%) (g) | Water (g) |
|---|---|---|---|---|---|
| Prior Art | | | | | |
| 3.5 | 68.5 | pH to 7 | 0.0 | 500.0 | 312.0 |
| 10.0 | 210.0 | pH to 7 | 0.0 | 500.0 | 312.0 |
| Present Invention | | | | | |
| 3.5 | 137.0 | 350.0 | 480.0 | 1000.0 | 1000.0 |
| 10.0 | 420.0 | 164.0 | 580.0 | 1000.0 | 1000.0 |

Coating composition were prepared for each composite as described in Example 7, and colour developer sheets were prepared, also as described in Example 7. These sheets were then tested with Papers C and D as described in Example 7. The results are set out in Tables 12c to 12f below in which HT and NHT each refer to composites according to the invention and have the same meaning as in Table 12e.

TABLE 12c

| | 3.5% Alumina - Paper C | | | | | |
|---|---|---|---|---|---|---|
| | C.I. Value | | Fade Data | | | |
| Sample | 2 min | 48 h | 5 hr | 10 hr | 30 hr | Delta |
| Prior Art | 54.6 | 44.9 | 67.4 | 80.8 | 91.0 | 46.1 |
| NHT | 46.4 | 36.4 | 64.5 | 78.0 | 87.3 | 50.9 |
| HT | 45.0 | 34.9 | 46.8 | 60.6 | 73.4 | 38.5 |

TABLE 12d

| | 10.5% Alumina - Paper C | | | | | |
|---|---|---|---|---|---|---|
| | C.I. Value | | Fade Data | | | |
| Sample | 2 min | 48 h | 5 hr | 10 hr | 30 hr | Delta |
| Prior Art | 49.6 | 42.5 | 65.9 | 80.7 | 90.7 | 48.2 |
| NHT | 80.8 | 61.0 | 73.8 | 81.2 | 89.5 | 28.5 |
| HT | 46.7 | 40.9 | 50.6 | 57.2 | 66.5 | 25.6 |

TABLE 12e

| | 3.5% Alumina - Paper D | | | | | |
|---|---|---|---|---|---|---|
| | C.I. Value | | Fade Data | | | |
| Sample | 2 min | 48 h | 5 hr | 10 hr | 30 hr | Delta |
| Prior Art | 49.1 | 36.0 | 51.9 | 62.0 | 76.5 | 40.5 |
| NHT | 43.5 | 32.8 | 54.0 | 67.7 | 79.5 | 46.7 |
| HT | 43.3 | 30.8 | 46.6 | 59.8 | 73.2 | 42.4 |

TABLE 12f

| | 10.5% Alumina - Paper D | | | | | |
|---|---|---|---|---|---|---|
| | C.I. Value | | Fade Data | | | |
| Sample | 2 min | 48 h | 5 hr | 10 hr | 30 hr | Delta |
| Prior Art | 44.7 | 33.5 | 54.4 | 65.3 | 78.6 | 45.1 |
| NHT | 74.1 | 57.9 | 66.6 | 74.9 | 84.6 | 26.7 |
| HT | 43.2 | 40.8 | 56.1 | 64.5 | 74.4 | 33.6 |

It will be seen that the present composite gave better initial colour developing ability than the prior art composite at 3.5% alumina content, regardless of the test paper and whether hydrothermal treatment was carried out. At 10% alumina content, the hydrothermally treated product showed a slight improvement in initial colour developing ability with Paper C, but, surprisingly, was worse after 48 hours development with Paper D. This result is thought to be anomalous or the consequence of a measuring error. The non-hydrothermally treated product with 10% alumina content was much poorer in initial colour developing ability than either the prior art composite or the hydrothermally treated composite, but this is entirely consistent with earlier-stated findings in relation to the effect of hydrothermal treatment.

The fade data shows the hydrothermally treated composites to be superior to the corresponding prior art composites at both alumina levels. The non-hydrothermally-treated product gave mixes results, with good fade resistance at 10% alumina content but not at 3.5% alumina content.

The results set out in Tables 12c to 12f above demonstrate that the present composites represent an advance over those disclosed in European Patent Applications Nos. 42265A and 42266A. The avoidance of the viscosity peak experienced when making the prior art composite is also a significant benefit.

We claim:

1. A process for the production of record material carrying a colour developer composition incorporating a hydrated silica/hydrated alumina composite in which hydrated silica predominates, in which process the composite is precipitated from an aqueous medium containing a solution of a metal silicate and an aluminum salt, and a coating composition incorporating the precipitated composite is formulated and then applied to a substrate which is subsequently dried to produce said record material, the process comprising the steps of:
   (a) gradually adding a metal silicate solution to a solution of an aluminum slat which is initially at a pH below 4 until the pH of the resulting mixture is approximately 4, thereby to induce some precipitation and to form a sol;
   (b) gradually adding alkali to said sol to raise the pH to approximately 7, thereby to induce further precipitation and gel the sol or further gel the sol, said gelled sol being a hydrated silica/hydrated alumina composite;

(c) separating the gel from the aqueous medium and washing the resulting product to remove dissolved salts; and (d) drying the washed product to an extent effective to collapse the structure of the gel and convert the gel structure form a hydrogen to a xerogel, and reducing it in particle size before formulation into the coating composition, with the proviso that if hydrated zirconia is also present in the precipitated composite, the zirconia content is less than about 10% on a dry basis, based on the total dry weight of alumina, silica and zirconia in the composite.

2. A process as claimed in claim 1, wherein the gelled sol produced in step (b) is subjected to a hydrothermal treatment before being separated and washed as specified in step (c).

3. A process as claimed in claim 1 wherein a hydrated metal oxide is precipitated from a metal salt solution so as to form part of the final composite.

4. A process as claimed in claim 3, wherein the hydrated metal oxide is of zinc, zirconium, copper or nickel.

5. A process as claimed in claim 1 wherein additional hydrated alumina is incorporated in the composite after it has been formed by a secondary precipitation from an aluminium salt solution.

6. A process as claimed in claim 1 wherein the hydrated alumina content of the composite is in the range 6 to 40% by weight, based on the total dry weight of hydrated silica and hydrated alumina.

7. A process as claimed in claim 6 wherein the hydrated alumina content of the composite is in the range 10 to 30%, based on the total dry weight of hydrated silica and hydrated alumina.

8. A process as claimed in claim 6 wherein the alumina content of the composite is about 20%, based on the total dry weight of the composite.

9. A process as claimed in claim 7 wherein the surface area of the composite is in the range 600 to 700 $m^2g^{-1}$ and the pore volume is in the range 0.7 to 1.1 $cm^3g^{-1}$.

10. a process as claimed in claim 1 wherein the particle size of the composite is said coating composition is in the range 4 to 6 $\mu$m.

* * * * *